United States Patent
Salhotra

(10) Patent No.: US 10,145,422 B2
(45) Date of Patent: Dec. 4, 2018

(54) DOUBLE CARDAN YOKE JOINT WITH A SINGLE WELD

(71) Applicant: ROOP AUTOMOTIVES LIMITED, Gurgaon (IN)

(72) Inventor: Pawan Kumar Salhotra, Gurgaon (IN)

(73) Assignee: ROOP AUTOMOTIVES LIMITED, Gurgaon (IN)

( * ) Notice: Subject to any disclaimer, the term of this patent is extended or adjusted under 35 U.S.C. 154(b) by 138 days.

(21) Appl. No.: 14/927,656

(22) Filed: Oct. 30, 2015

(65) Prior Publication Data

US 2016/0281791 A1  Sep. 29, 2016

(30) Foreign Application Priority Data

Mar. 26, 2015  (IN) .............................. 844/DEL/2015

(51) Int. Cl.
   *F16D 3/32*  (2006.01)

(52) U.S. Cl.
   CPC ............ *F16D 3/32* (2013.01); *F16D 2250/00* (2013.01); *Y10S 464/905* (2013.01); *Y10T 29/49622* (2015.01)

(58) Field of Classification Search
   CPC ..... F16D 3/32; F16D 2250/00; Y10S 464/905
   USPC ......................................... 464/117, 118, 134
   See application file for complete search history.

(56) References Cited

U.S. PATENT DOCUMENTS

| | | | | |
|---|---|---|---|---|
| 1,389,422 A | * | 8/1921 | Curtis | F16D 3/40 464/134 |
| 3,470,712 A | * | 10/1969 | Geisthoff et al. | F16D 3/32 464/118 X |
| 4,646,552 A | * | 3/1987 | Kanbe | B21D 35/00 29/896.7 |
| 4,650,439 A | * | 3/1987 | Mayhew | F16D 3/32 464/118 X |
| 4,799,817 A | * | 1/1989 | Geisthoff | F16D 3/32 |
| 2016/0003305 A1 | * | 1/2016 | Bonte | F16D 3/32 |

FOREIGN PATENT DOCUMENTS

GB    11308    * 5/1897 .................... 464/117

OTHER PUBLICATIONS

Universal Joint and Driveshaft Design Manual. AE-7, Society of Automotive Engineers, Inc., Warrendale, PA, pp. 123-125, TJ1079. S62 1979.*

* cited by examiner

*Primary Examiner* — Greg Binda
(74) *Attorney, Agent, or Firm* — Kunzler, PC

(57) ABSTRACT

A double cardan yoke joint is disclosed. The double cardan yoke joint comprises a housing having an axial direction. The housing includes a top end and a bottom end. The double cardan yoke joint further comprises at least four flanges positioned inwardly with respect to the axial direction of the housing. The two of the at least four flanges are provided on the top end of the housing and remaining two of the at least four flanges are provided on the bottom end of the housing. The housing is a circular housing with a single weld. The single weld is disposed along the axial direction of the housing.

3 Claims, 6 Drawing Sheets

DOUBLE CARDAN YOKE JOINT WITH A SINGLE WELD

RELATED APPLICATIONS

Benefit is claimed under 35 U.S.C. 119(a)-(d) to Foreign application Serial No. Mar. 26, 2015, filed in India entitled "DOUBLE CARDAN YOKE ASSEMBLY", on Mar. 26, 2015, by Roop Automotives Limited, which is herein incorporated in its entirety by reference for all purposes.

FIELD OF THE INVENTION

The present invention relates to a double cardan yoke joint and in particular, the present invention relates to a double cardan yoke joint which is used as a constant velocity (CV) joint of a steering column for a four wheeler. More particularly, the present invention relates to a double cardan yoke joint which transmits torque to the wheels. Furthermore, the present invention also relates to a double cardan yoke joint which provides safety and reliability.

BACKGROUND OF THE INVENTION AND THE RELATED PRIOR ART

Tilting multi-wheeled vehicles, in particular, tilting three wheeled vehicles with two front wheels are operated like motorcycles where such vehicles lean into a turn. Unlike motorcycles, an added extra wheel in front provides additional traction for improved stopping and control of the vehicle on slippery surfaces. This type of vehicle is usually lighter, and can be made narrower than a non-titling three or four wheeled vehicle.

Double Cardan joints are similar to double Cardan shafts, except that the length of the intermediate shaft is shortened leaving only the yokes; this effectively allows the two Hooke's joints to be mounted back to back. DCJs are typically used in steering columns, as they eliminate the need to correctly phase the universal joints at the ends of the intermediate shaft (IS), which eases packaging of the IS around the other components in the engine bay of the car. They are also used to replace Rzeppa style constant-velocity joints in applications where high articulation angles, or impulsive torque loads are common, such as the driveshafts and halfshafts of rugged four wheel drive vehicles. Double Cardan joints require a centering element that will maintain equal angles between the driven and driving shafts for true constant velocity rotation. This centering device requires additional torque to accelerate the internals of the joint and does generate some additional vibration at higher speeds.

The Thompson constant velocity joint (TCVJ), also known as a Thompson coupling, assembles two cardan joints within each other to eliminate the intermediate shaft. A control yoke is added to keep the input, and output shafts aligned. The control yoke uses a spherical pantograph scissor mechanism to bisect the angle between the input and output shafts and to maintain the joints at a relative phase angle of zero. The alignment ensures constant angular velocity at all joint angles. Eliminating the intermediate shaft and keeping the input shafts aligned in the homokinetic plane greatly reduces the induced shear stresses and vibration inherent in double cardan shafts The patent document JP2011021667 refers to enhance the rigidity and strength of a coupling yoke in a double cardan joint. This double cardan joint includes the coupling yoke, and a socket yoke and a pin yoke connected singingly to respective ends of the coupling yoke via a cross shaft. The coupling yoke includes a base ring, and a pair of supports projected at respective shaft-directional ends of the base ring. The pair of supports have support holes engaged with a shaft of the cross shaft, and tips of the paired supports are connected to each other by an adjacent part.

The other document JP2003120708 discloses a method for easily manufacturing a yoke for a double cardan type universal joint. This yoke forms an elongated blank 10 having five areas constituted in the lengthwise direction by cutting a metallic plate, and these constituted areas are a central area, two end area, and intermediate areas positioned between the central area and the respective two end areas. The two end areas become an installing part of a shaft by mutually overlapping by bending the elongated blank, and a pivot member to be installed in the central area of the elongated blank is put in the aligning relationship in the shaft direction to the shaft. Bores 28 and for installing a cross piece for rotatably installing the yoke in a joining member are preferably arranged in the intermediate area.

According to the document JPH11241730 to inexpensively manufacture a coupling yoke simple in molding and having high strength by projecting arm parts from a semi-cylindrical part to both the sides in a shaft direction, providing two half ring members having holes at the tip parts of the arm parts and welding the half ring members each other. A coupling yoke is provided with two plane symmetrical half ring members. The half ring member is constituted of a semi-cylindrical shaped semi-cylindrical part and a substantially semi-circular arm part extending from the center part of this semi-cylindrical part to both sides of a shaft direction. The arm part is provided with a pin hole into/through which each cross pin is inserted/passed. At both the ends of the semi-cylindrical part, bevels are provided, the bevels of the two semi-cylindrical parts are allowed to abut each other and the two half ring members are integrally joined by welding. As a result, the coupling yoke 1 is easily molded and is inexpensive and strong.

The document JPH11218149 describes a coupling yoke in a double cardan joint, easy to manufacture and low in cost with good material yield. A coupling yoke is provided with a cylindrical member formed by cutting a pipe, and a pair of nearly rectangular plates formed by cutting a band steel plate or blanking a steel plate. Holes are opened in both ends of each plate. The center parts of the plates are overlapped and welded to the cylindrical member so as to oppose the plates to each other.

According to the invention WO2006061663 the technical field of an engine comprises a body with four cylinders, which are double-row installed, along axes of which pistons are in a reciprocal motion. The pistons by means of rods hingedly engage with yoke, which is hingedly installed in the body with a possibility of rocking. The yoke, in turn, is hingedly connected to a wobbler, which is installed by means of bearing on a main shaft of the engine with an inclination with respect to its rotary axis. When looking at the engine cutting, which is perpendicularly carried out with respect to the rotary axis of the main shaft, a medium point of each hinge, providing with an engagement of the yoke with the wobbler, is placed in an angle sector, which is formed, between medium points of the hinges, providing with the engagement of the yoke with rods. In case of the invention realization in accordance with one of its embodiments a connection of the yoke with the wobbler is accomplished by means of spherical of cardan, hinge, and it gives a capability to move the yoke with respect to an oscillating center of the wobbler, and it, in turn, provides with a capability of compression ratio change in the engine cylinders. In case of the invention realization in accordance with another its embodiment the main shaft of the engine and the wobble-yoke unit are replaced out of zone of placing the cylinders with an installation in the same or additional body formation, and the yoke is designed with an elongated axis of rocking and is provided with a rocker, which is connected with the pistons or with joint rods.

The system has a journal cross assembly mounted in double yokes, with two yoke parts each with a foot and a bearing part for the cross journals. The foot parts are connected via coupling faces, and have facing complementary first toothed sections, and there are second toothed sections at an angle to the first. Each foot part is formed as a full flange and is connected flush to the bearing part. The journal, cross assembly has two journal systems, relatively offset through 90°, and each with two journals, which are offset through 180° and are positioned on a common axis in parallel planes. Each bearing part has a blind bore for the journals. For heavy-duty cardan shafts. Requires less space, simple fabrication and assembly which has been stated in document of patent application DE102004017104.

The document US2012178541 describes in the existing integral-type coupling yoke, the base portion from which the flange portions protrude is formed of a block-like thick wall portion; however, in the case where the drive-side yoke and the driven-side yoke, which are coupled by the coupling yoke, are spaced apart slightly, when the length of the base portion is extended in the axial direction in order to ensure torsional stiffness, the overall weight of the coupling yoke increases accordingly. As the weight increases, the inertia moment of the coupling yoke increases, so a loss of energy at the time when driving force is transmitted from the drive-side yoke to the driven-side yoke increases.

The document US2006005393 illustrates a method for manufacturing a combined driveshaft tube and yoke assembly includes the initial step of orienting a first component having a first wall thickness and a second component having a second wall thickness to define an overlap region. The first and second components may have the same or different wall thicknesses, may be formed from the same or different materials, and may have the same or different lengths. Portions of the first and second components are deformed to provide the overlap region with a third wall thickness that is the sum of the first, wall thickness and the second wall thickness. Lastly, a pair of yoke arms having respective openings there through is formed in the overlap region to provide a combined driveshaft tube and yoke assembly. A pair of combined driveshaft tube and yoke assembly can also be manufactured in accordance with this method.

The document 5609/CHENP/2008 states the yoke member of cardan joint is made in one unitary part of one piece and includes a pivot fork including two pivot arm portions each comprising a crossing hole, the axis of which is the pivot axis of a cross-piece, and a connecting element for the motion transmission shaft and having two tightening portions connected via a junction portion. Each of the two tightening portions comprises a tightening hole. Four reinforcing appendices are arranged on the tightening portions and opposite one another in pairs to form together with the portions a housing for the motion transmission shaft. The yoke member is stamped in order to give it the desired thickness in highly stressed and lowly stressed regions.

None of these above patents, however alone or in combination, disclose the present invention. The invention consists of certain novel features and a combination of parts hereinafter folly described, illustrated in the accompanying drawings, and particularly pointed out in the appended claims, it being understood that various changes in the details may be made without departing from the spirit, or sacrificing any of the advantages of the present invention.

SUMMARY OF THE INVENTION

The present invention discloses a double cardan yoke joint. The double cardan yoke joint comprises a housing having an axial direction. The housing includes a top end and a bottom end. The double cardan yoke joint further comprises at least four flanges positioned inwardly with respect to the axial direction of the housing. The inward positioning of each of the flanges with respect to axial direction prevents bending of flanges during torque transmission. Therefore, the flanges of the present invention are stiff and resistant against any lateral bending during transmission of torque.

Further, the two of the at least four flanges are provided on the top end of the housing and remaining two of the at least four flanges are provided on the bottom end of the housing. The housing is a circular housing with a single weld. The single weld is disposed along the axial direction of the housing.

BRIEF DESCRIPTION OF DRAWINGS

For the purpose of facilitating an understanding of the invention, there is illustrated in the accompanying drawings, a preferred embodiment thereof from an inspection of which, when considered in connection with the following description, the invention, its construction and operation, and many of its advantages should be readily understood and appreciated. The drawings are in six sheets.

DETAILED DESCRIPTION OF DRAWINGS

Figure 1:
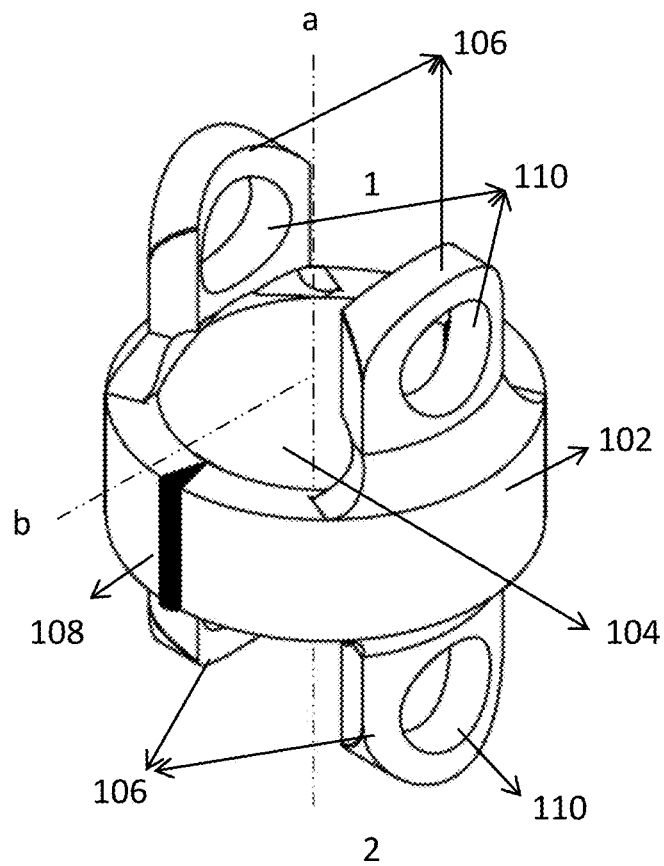
FIG. 1 depicts an exemplary double cardan yoke joint in accordance with an embodiment of the present invention.

Prior to describing the invention in detail, definitions of certain words or phrases used throughout this patent document will be defined: the terms "include" and "comprise", as well as derivatives thereof, mean inclusion without limitation; the term "or" is inclusive, meaning and/or; the phrases "coupled with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; Definitions of certain words and phrases are provided throughout this patent document, and those of ordinary skill in the art will understand that such definitions apply in many, if not most, instances to prior as well as future uses of such defined words and phrases.

Wherever possible, same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Particular embodiments of the present disclosure are described herein below with reference to the accompanying drawings, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The present invention discloses a double cardan yoke joint which may be employed to provide a rotational driving connection between two driveshafts which can accommodate a limited amount of angular misalignment between the rotational axes of the driveshafts. The double cardan yoke joint may be utilized for different applications such as in stone crushers, belt conveyors, etc. In an embodiment, the double cardan yoke joint is used as a constant-velocity (CV) joint in a steering column for transmitting torque to the wheels in four wheelers.

The present invention overcomes the disadvantages of conventional double cardan yoke joints by providing a robust and risk free design. In an embodiment of the present invention, the double cardan yoke joint has a single weld. The utilization of a single weld reduces the risk factor associated with the double cardan yoke joint by 50% as compared to the conventional joints. Moreover, dimensional accuracies are easily achieved with the single weld design.

FIG. 1 of the present invention discloses an exemplary architecture of a double cardan yoke joint 100. In an embodiment, the double cardan joint 100 of the present invention is an H-shaped joint with a tubular structure. The double cardan joint 100 may be constructed from a single sheet of metal. The metal utilized in the construction of double cardan yoke joint 100 may be any durable material known in the art such as steel, stainless steel, brass, etc. The double cardan joint 100 requires a single weld for its construction.

The double cardan yoke joint 100 as depicted in FIG. 1 may include the following components, without limitation at least one housing 102, a hollow cavity 104 and at least four flanges 106. Each flange 106 may further include at least one hole 110.

In an exemplary of the present invention depicted in FIG. 1, the double cardan yoke joint 100 has a single housing 102. The presence of a single housing 102 helps to achieve effective weight reduction while ensuring necessary torsional stiffness in the double cardan yoke joint 100. The housing 102 may be of any predefined dimension and shape such as square, circular, etc. As shown in FIG. 1, the housing 102 is a circular unit. The housing 102 may be dimensioned in such a way that it may receive a driveshaft(s).

The housing 102 of the double cardan yoke joint 100 defines an axial direction "a" and a radial direction "b". The axial direction "a" of the housing 102 corresponds to a longitudinal axis of the housing 102 while the radial direction "b" corresponds to a radial axis of the housing 102. The housing 102 may include at least four flanges 106. The flanges 106 may be of any predetermined dimension and shape such as triangular, square, rectangular, circular, etc. In an embodiment, the flanges 106 are semi-circular in shape. In an embodiment of the present invention, two flanges 106 are disposed at the top end 1 of the housing 102 while two flanges 106 are disposed at the bottom end 2 of the housing 102. As depicted in FIG. 1, the two flanges 106 disposed at the top end 1 of the housing 102 mutually face each other. The same arrangement may be replicated at the bottom end 2.

As shown in FIG. 1, each flange 106 of the double cardan yoke joint 100 is placed inward with respect to the axial direction "a" of the housing 102 at a predefined angle. The inward positioning of each of the flanges 106 with respect to axial direction 'a' prevents bending of flanges 106 during torque transmission. Therefore, the flanges 106 of the present invention are stiff and resistant against any lateral bending during transmission of torque.

Alternately, the flanges 106 may be outwardly placed with respect to the axial direction "a" or may be placed parallel to the axial direction "a".

Each flange 106 may further contain one or more holes 110. The holes 110 are dimensioned to compliment the diameter of a bearing for receiving the same. The double cardan joint 100 allows two driveshafts to be seated on the top 1 and bottom end 2 respectively. The driveshafts may be fixed with the help of mating between bearing and holes 110 disposed on the flanges 106.

The housing 102 of double cardan joint 100 includes a single weld 108. As depicted in the diagram, the single weld 108 joins the two free ends of the material that make up the housing 102. In an embodiment, the single weld 108 is disposed at one side of the housing 102 along the axial direction "a". The single weld 108 may be visibly present or may be concealed with the help of any weld mark hiding techniques known in the art. In an embodiment, the weld 108 is a result of welding which is a part of the process of construction of the double cardan joint 100 as explained in FIG. 2.

The structure of the double cardan yoke joint 100 includes a hollow cavity 104. The hollow cavity 104 may be a cylindrical hollow tube. The hollow cavity 104 may be employed to receive two driveshafts from the top end 1 as well as the bottom end 2 of the double cardan yoke joint 100 respectively. In an embodiment, the hollow cavity 104 has a fixed and uniform diameter along the radial direction "b" which may correspond with the diameter of the driveshafts.

Figure 2:
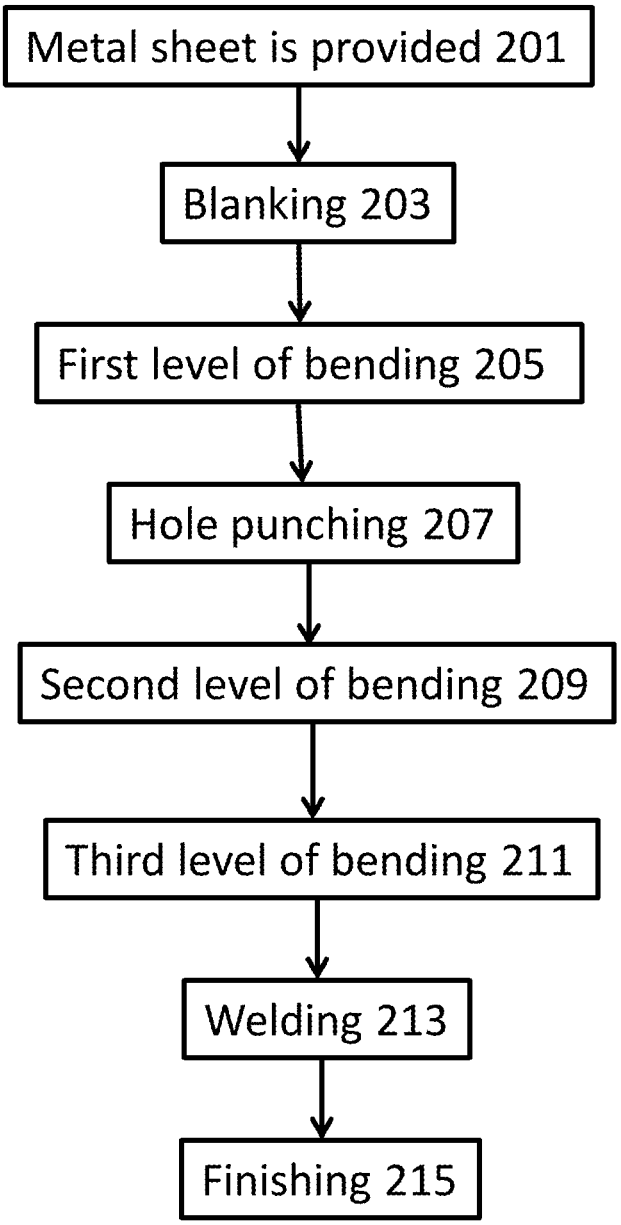
FIG. 2 shows an exemplary flowchart of the various stages involved in the construction of the double cardan yoke joint of FIG. 1 in accordance with an embodiment of the present invention.

FIG. 2 depicts a flowchart for the stages involved in the construction of the double cardan yoke joint 100 of FIG. 1. The double cardan yoke joint 100 may be constructed from a single sheet of material. The material utilized for the said purpose may be any durable material known in the art such as steel, stainless steel, brass, fibre, etc. In case a metal sheet is used, the stages involved in construction of the double cardan yoke joint 100 from a single metal sheet may include various metal working processes. Such processes may be, without limitation, blanking, embossing, notching, bending, punching, welding, honing, deburring, etc.

Figure 3A:
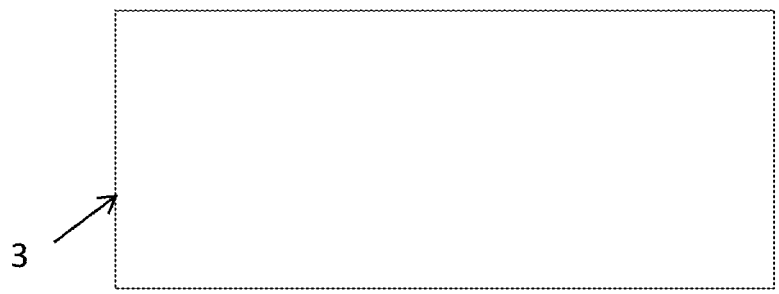
FIGS. 3a-3h illustrate the various stages involved in construction of the double cardan yoke joint 100 with reference to FIG. 2 in accordance with an embodiment of the present invention.

The process of construction starts at step 201 using a metal sheet 3 (as shown in FIG. 3a).

At step 203, the said metal sheet 3 is blanked to obtain a first structure 30 of a predefined shape. In an embodiment, the first structure 30 obtained by blanking is an H-shaped block with extensions F1 and F2 (or free ends). The ends of the vertical rods of the H-shaped block are referred to as flanges 302. The parameters of blanking process may be such as temperature, pressure, etc. The blanking of metal sheet may be performed by any punching equipment known in the art. For example, the process of blanking may be carried out with the help of a mould of a desired shape. The shape of the mould is then translated onto the metal sheet during blanking and a piece of metal with the said shape is punched out.

Figure 3B:
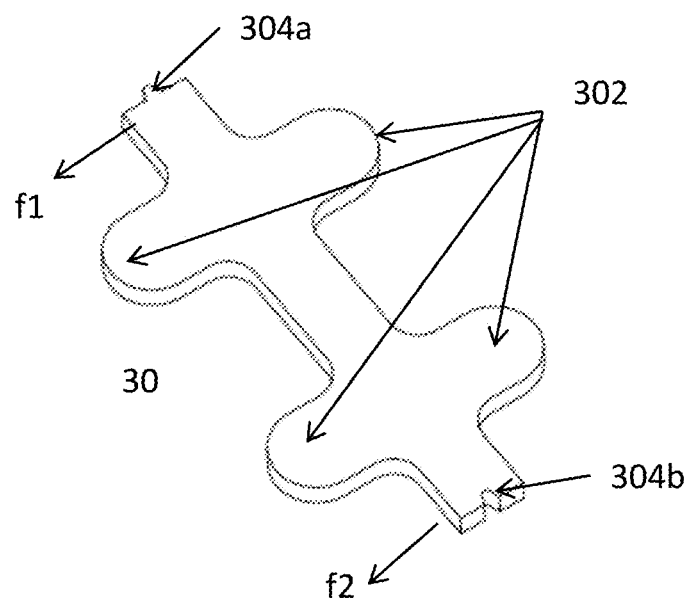

The process of blanking may be carried out without limitation, alone or followed by notching. In an embodiment, the piece of metal obtained after blanking is further notched to produce notches at the free ends of the piece of metal. In another embodiment, the mould used for blanking includes notches at its free ends which eliminate separate notching procedure. In an embodiment, a first structure 30 is obtained with notches 304*a*, 304*b* at its extended free ends f1, f2 as shown in FIG. 3*b*. As represented in FIG. 3*b*, the notch 304*a* disposed at the free end f1 has an indent type of a notch. The notch 304*b* disposed at the free end f2 has an incision type of a notch. Such notches 304*a*, 304*b* aid in sealing the free ends f1, f2 at the time welding at step 213.

Post blanking, the process of embossing may be optionally performed. The first structure 30 is embossed by any procedure known in the art. The process of embossing may be accompanied with a slight bending of the flanges 102. This step results in formation of flanges which are inclined at a predetermined angle with respect to the rest of the body of first structure 30. The embossed surfaces 306 (depicted in FIG. 3*d*) provide structural stability and strength to the double cardan joint 100.

Figure 3C:
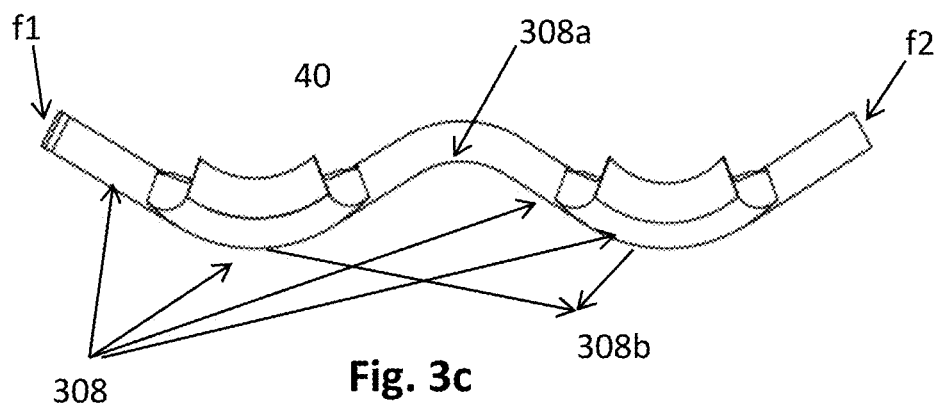
Figure 3D:
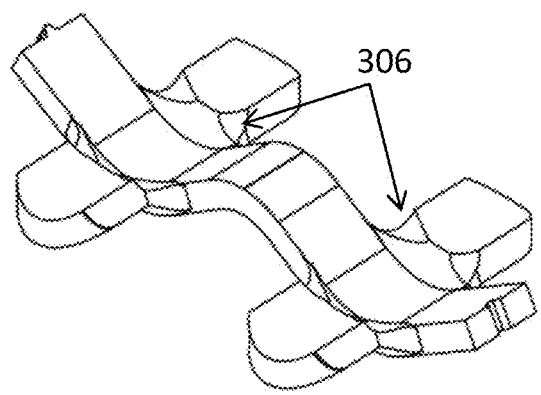

At step 205, the first structure 30 (obtained from the last step) is processed by first level of bending to yield a second structure 40. The process of bending may be performed by any technique known in the art. The process of first level of bending may be performed at different parameters such as temperature, pressure, etc. selected on the basis of metal used. The first structure 30 may be bent to produce a wave like structure as shown in FIGS. 3*c* (side view) & 3*d* (3D perspective view). As depicted, the second structure 40 has uniform curves 308 disposed at predefined angles. In the exemplary embodiment of FIG. 3*c*, the wave-like second structure 40 has curves 308 which include one crest 308*a* and two troughs 308*b*.

Figure 3E:
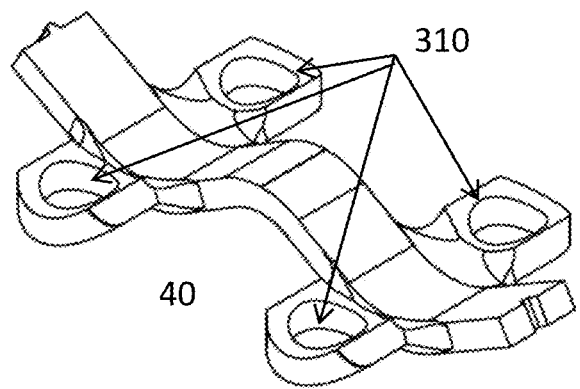

At step 207, holes are punched in the flanges 302 of the second structure 40. The process of punching may be performed at predefined parameters such as temperature, pressure, etc. The process of punching may be carried out by any technique of punching known in the art. The second structure 40 with holes 310 disposed at the flanges 302 is obtained as shown in FIG. 3*e*. Each hole 310 may have a predetermined diameter which compliments the diameter of the bearing.

Figure 3F:
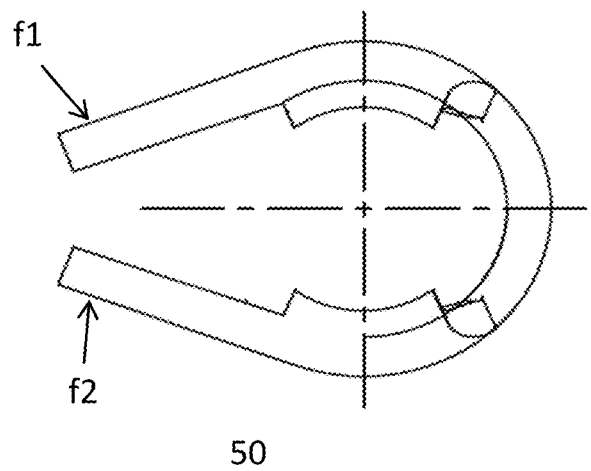

At step 209, the second structure 40 is further processed by a second level of bending to yield a third structure 50. The second level of bending is targeted to bend the second structure 40 in U-shape with the free ends f1, f2 of close to each other as shown in FIG. 3*f*. In an embodiment of the present invention, the U-shape is obtained by inverting the crest 308*a* in opposite direction. The inverted crest 308*a* may further be stretched till the free ends f1, f2 are aligned close to each other. The bending of second structure 40 may be performed by any method and equipment known in the art. The parameters of bending such as temperature, pressure, etc., may be predefined and based upon the metal used.

Figure 3G:
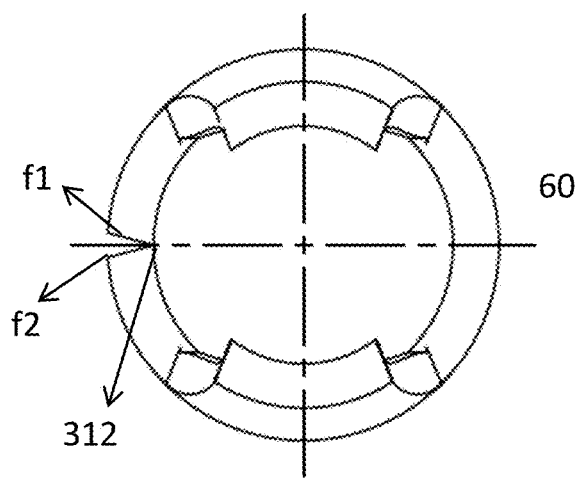

At step 211, the third structure 50 undergoes a third level of bending to mate its free ends f1, f2 to yield a fourth structure as shown in FIG. 3*g*. The third level of bending may transform the U-shape of the third structure 50 to a complete round shape. The process employed in the third level of bending may be any process known in the art. The parameters employed for third level of bending may be different or similar to that of the first or second level of bending. The fourth structure 60 obtained at the end of step 211 is completely or nearly round. Further, the free ends f1, f2 of the fourth structure 60 face each other with notches 304*a* and 304*b* close to each other. The round shaped fourth structure 60 has one point of contact 312 as shown in FIG. 3*g*.

The third level of bending may be followed by a flatness operation on the fourth structure 60. The flatness operation may be performed by any method known in the art. The said process may aid to smoothen and provides uniformity in the round shaped fourth structure 60.

Figure 3H:
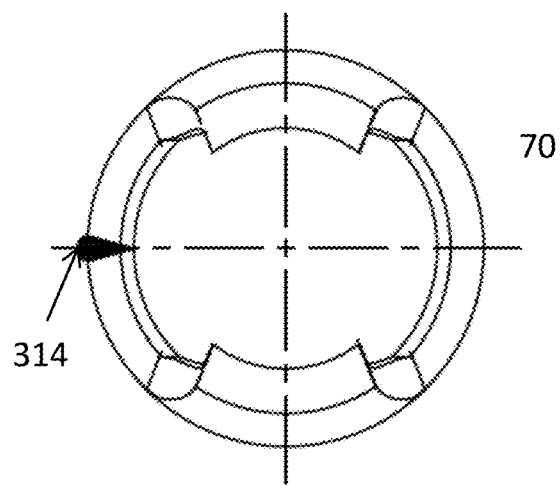

At step 213, the free ends f1, f2 of the fourth structure 60 are welded together. Welding may be performed using any technique known in the art. The process may be performed at predefined parameters such as temperature, pressure, etc. In an embodiment, welding is performed after the notch 304*a* disposed at the free end f1 is completely seated in the notch 304*b* disposed at the free end f2. The fourth structure 60 is welded around the mating of notch 304*a* and notch 304*b* to seal the free ends f1, f2. Subsequently, a double cardan yoke joint 70 as shown in FIG. 3*h* is obtained. The double cardan yoke joint 70 has a single weld 314.

The double cardan yoke joint 70 is employed for finishing at step 215. The process of finishing may involve without limitation, hole boring, honing, deburring, washing, inspection and packaging of the double cardan yoke joint 70. The process of finishing may optionally include number punching and logo punching on the double cardan yoke joint 70.

Such finishing processes aim to trim and smoothen the surface of the double cardan yoke joint 70. The double cardan yoke joint 70 may further be employed for quality inspection and then packed if the quality is assured.

Advantages Over the Prior Art

The double cardan yoke joint 100 proposed by the present invention has the following advantages over the prior art
  it is cost effective as compared to other devices available in the market
  It has the characteristics of simple structure, convenient use and high efficiency
  It is economical in maintenance
  Easy to assemble In the preceding specification, tire invention has been described with reference to specific exemplary embodiments thereof it will be evident that various modifications and changes may be made thereunto without departing from the broader spirit and scope of the invention as set forth in the claims that follow. The specification and drawings are accordingly to be regarded in an illustrative rather than restrictive sense. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A double cardan yoke joint comprising:
   a housing having an axial direction, the housing including a top end, a bottom end, and at least four flanges positioned inwardly with respect to the axial direction of the housing, two of the at least four flanges being provided on the top end of the housing and the remaining two of the at least four flanges being provided on the bottom end of the housing, wherein the housing is a circular housing with a single weld, the single weld being disposed along the axial direction of the housing.

2. The double cardan yoke joint of claim 1 wherein the edges of the at least four flanges are semi-circular in shape.

3. The double cardan yoke joint of claim 1 wherein each flange of the at least four flanges comprises at least one hole.

* * * * *

UNITED STATES PATENT AND TRADEMARK OFFICE
CERTIFICATE OF CORRECTION

PATENT NO. : 10,145,422 B2
APPLICATION NO. : 14/927656
DATED : December 4, 2018
INVENTOR(S) : Pawan Kumar Salhotra Page 1 of 1

It is certified that error appears in the above-identified patent and that said Letters Patent is hereby corrected as shown below:

On the Title Page

Item "(71)" listing the Applicant information, the Applicant's country was erroneously stated as HR (Croatia). The correct country is IN (India).

Signed and Sealed this
First Day of January, 2019

Andrei Iancu
*Director of the United States Patent and Trademark Office*